Sept. 2, 1941.                    J. C. COX                    2,254,887
                          BRAKE ADJUSTING MECHANISM
                          Filed March 14, 1940           2 Sheets-Sheet 1
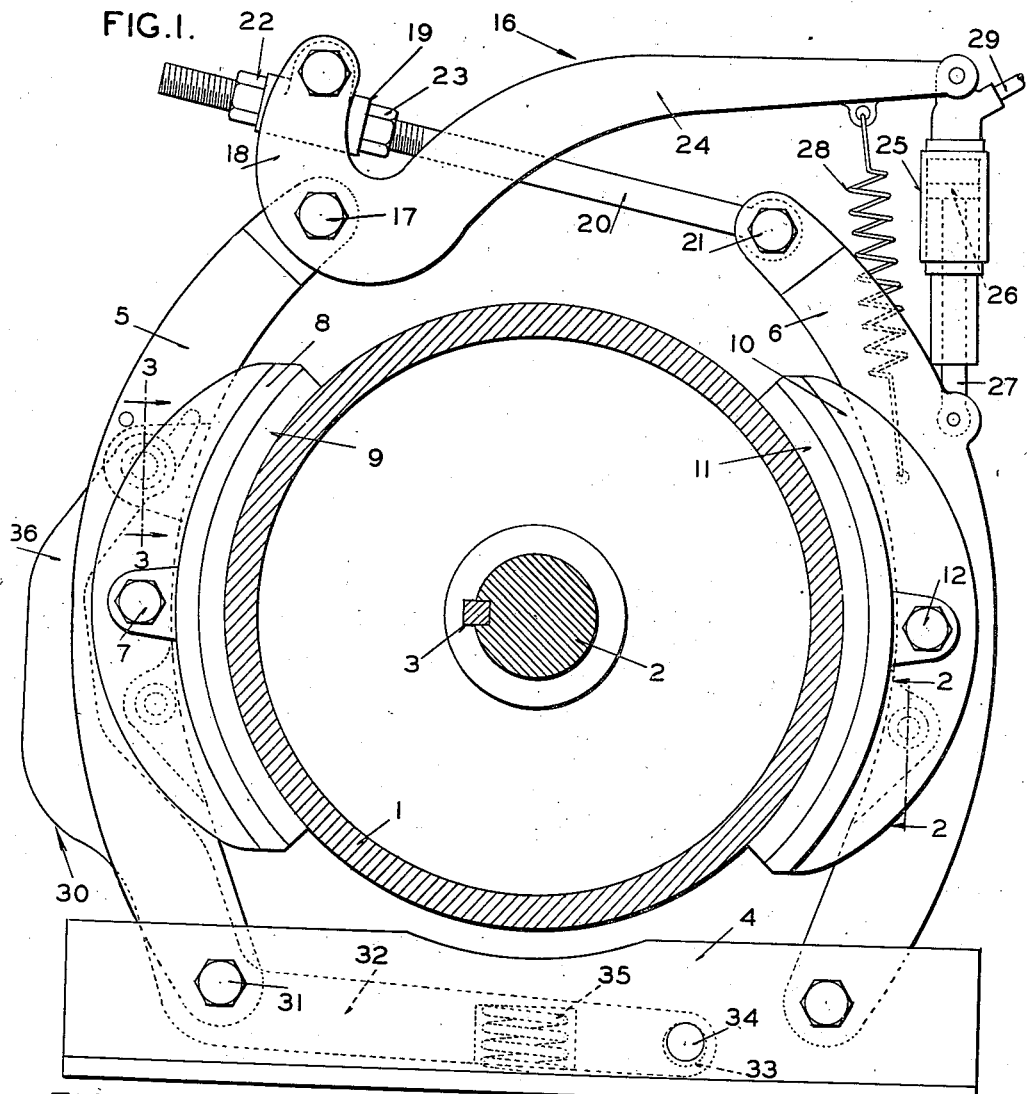
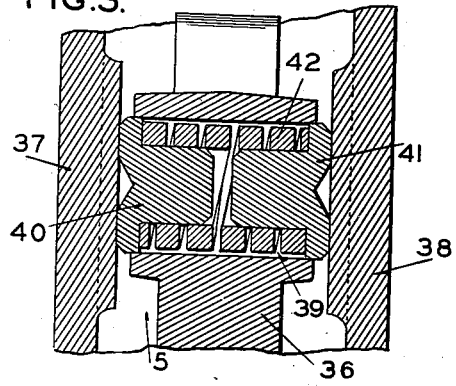
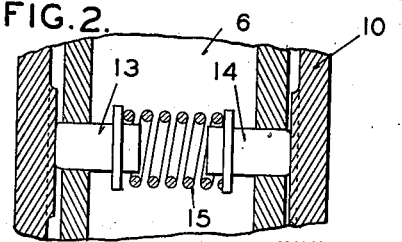
INVENTOR
JOHN C. COX
BY
ATTORNEY Sept. 2, 1941.  J. C. COX  2,254,887
BRAKE ADJUSTING MECHANISM
Filed March 14, 1940  2 Sheets-Sheet 2

INVENTOR
JOHN C. COX
BY
ATTORNEY

Patented Sept. 2, 1941

2,254,887

UNITED STATES PATENT OFFICE 2,254,887

BRAKE ADJUSTING MECHANISM

John C. Cox, Clayton, Mo., assignor to Wagner Electric Corporation, St. Louis, Mo., a corporation of Delaware Application March 14, 1940, Serial No. 323,860

10 Claims. (Cl. 188—79.5)

My invention relates to brakes and more particularly to adjusting mechanism therefor, its primary object being to provide a single adjusting mechanism for a brake embodying two pivotally mounted shoes, which means will be automatically operable to maintain the "off" position of at least one shoe substantially constant and to insure that both shoes will be held off the drum.

Another object of my invention is to provide a simple automatic adjusting mechanism that can be incorporated in an existing type of brake with only slight modifications thereof.

Figure 4:
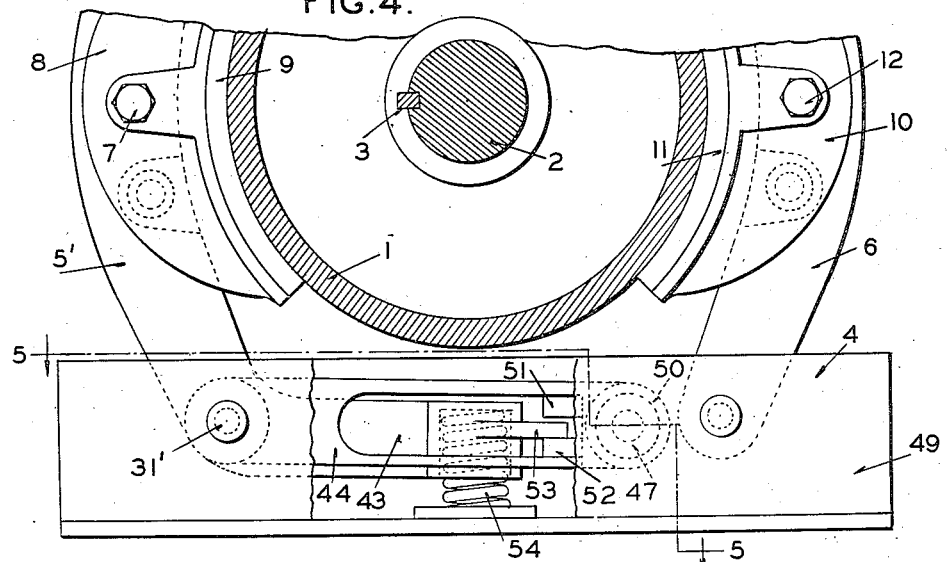
Figure 5:
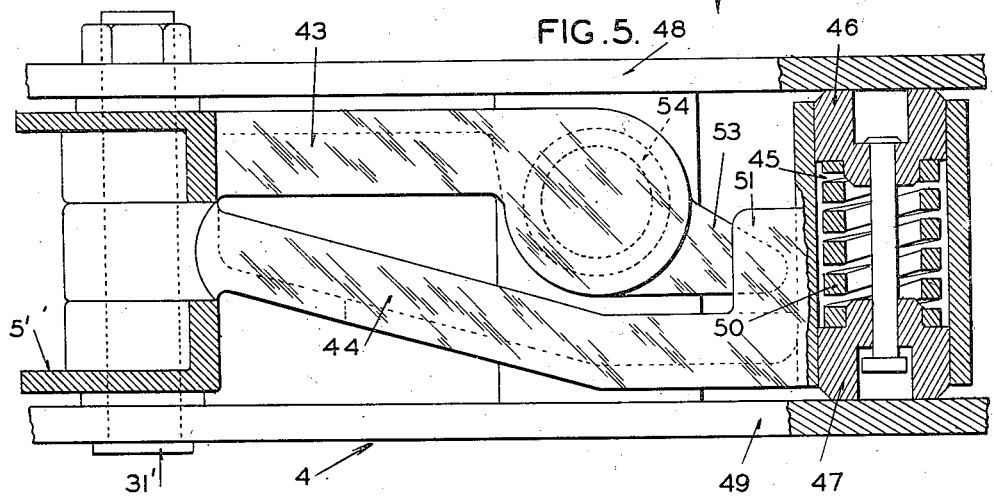

Other objects of my invention will become apparent from the following description taken in connection with the accompanying drawings in which Figure 1 is a view partly in section of a brake and an associated automatic adjusting mechanism embodying my invention; Figures 2 and 3 are sectional views taken on the lines 2—2 and 3—3 of Figure 1 and showing details of construction; Figure 4 is a view showing a modified construction; and Figure 5 is a sectional view taken on the line 5—5 of Figure 4.

Reference to the drawings in detail I have shown my invention as being embodied in an external shoe brake which is especially designed for industrial purposes and usable in connection with hoists, cranes and other such mechanism. It is to be understood, however, that the invention may be embodied in other types of brakes as the disclosure is by way of example only.

As shown in Figure 1, a brake drum 1 is secured to a shaft 2 by suitable means such as a key 3. Below the drum is a base member 4 which is mounted on any suitable support adjacent the drum. Pivotally mounted on the base member are two levers 5 and 6 extending upwardly on opposite sides of the drum, these levers being channel-shaped in cross-section and curved to a certain degree in order to partially embrace the drum. The lever 5 intermediate its ends has pivotally mounted thereon by means of a pin 7 a brake shoe 8 provided with lining 9 for cooperation of the external surface of the drum. A similar brake shoe 10 provided with lining 11 is pivotally mounted on the lever 6 by means of a pin 12. Each lever carries friction means for cooperation with its shoe in order to frictionally hold the shoe in proper position on the lever but at the same time not prevent the shoe from so adjusting itself with respect to the lever that it can properly engage the drum. As best shown in Figure 2 each friction means comprises two pins 13 and 14 carried by the lever and interposed therebetween is a spring 15 for spreading the pins and causing them to frictionally engage the flanges on the shoe positioned on opposite sides of the lever.

The actuating means for the brake comprises a curved actuating lever 16 pivoted intermediate its ends on the free end of the lever 5 by means of a pin 17. The short arm 18 of the lever 16 has pivotally mounted thereon a knuckle 19 which is adjustably connected to a rod 20 pivotally connected by means of a pin 21 to the free end of the lever 6. The rod 20 extends through an opening in the knuckle and adjustment is provided by means of nuts 22 and 23 threaded on the rod and positioned on opposite sides of the knuckle. The long arm 24 of the lever 16 is pivotally connected to one end of a cylinder 25 of a fluid motor and reciprocal in this cylinder is a piston 26 which is anchored by means of a piston rod 27 to the lever 6. In order that the shoes may be retracted from the drum a spring 28 is interposed between the actuating lever 16 and the shoe carrying lever 6, this spring also holding the end of the cylinder against the piston when the fluid motor is not being operated.

If it is desired to apply the brake, fluid under pressure is admitted to the cylinder 25 of the fluid motor by means of a conduit 29 leading from a suitable source of pressure (not shown). This will cause relative movement between the cylinder and the piston and result in the lever 16 being swung in a counterclockwise direction as indicated by the arrow to draw the ends of the levers 5 and 6 together and bring the shoes into engagement with the drum.

In braking constructions of the type just described wherein the actuating mechanism is supported upon the brake shoes or the shoe carrying levers and movable therewith, the brake shoes, or at least one of them, have a tendency to drag on the drum when they are released unless some means associated with the support is provided for holding them away from the drum. The dragging of the shoes on the drum is of course objectionable since it results in unnecessary wear of the brake lining and also heating of the drum.

In accordance with my invention I have provided means which will insure that both shoes will be maintained disengaged from the drum whenever the brake is released. This means is so associated with one of the brake shoes that it will be automatically operable to also insure that the "off" position clearance between this brake shoe and the drum will be substantially constant. The particular structure shown to accomplish the desired result comprises a bell-crank arm 30 pivotally mounted at its elbow of the pin 31 which constitutes the pivot for the brake shoe carrying lever 5. The end 32 of this arm extends beneath the drum and is provided with an opening 33 for receiving a pin 34 carried by the base member. The opening 33 is slightly oversize with respect to the pin 34, thus permitting the arm to have limited pivoted movement on the pin 31. A spring 35 biases the arm so that the clearance between the pin and the opening 33 will be above the pin. The other end 36 of the arm 30 extends to a point above the pivot pin 7 of the shoe 8 and is positioned between the legs 37 and 38 of the channel-shaped lever 5. This end of the arm (as shown in Figure 3) is provided with an opening 39 and positioned in this opening are two friction plugs 40 and 41 having interposed therebetween a coil spring 42 for biasing the plugs into tight frictional engagement with the inner surfaces of legs 37 and 38. The spring 42 is of such strength as to create sufficient friction between the arm 30 and the lever 5 that the two members will not have relative movement when the brake is released under the action of the retracting spring 28, previously referred to. The friction however is not such as to prevent the lever 5 from moving relatively to the arm 30 when the lever applies the shoe 8 to the drum and the pin 34 prevents the arm 30 from moving with the lever.

When initially adjusting the brake the nuts 22 and 23 are first so manipulated as to bring the shoes 8 and 10 into engagement with the drum then the nut 32 is backed off two turns and locked by nut 23. Both shoes will now be free of the drum and shoe 8 will have a predetermined clearance as determined by the oversize of the opening 33 in arm 30. The oversize of opening 33 permits the shoes to be applied without any slipping of the friction connection between the arm and the lever 5. As the lining of the shoes wears it will be necessary to move the lever 5 closer to the drum when the brake is applied and since the pin 34 will not permit the arm to follow the lever 5 there will be a slight slip between the plugs 40 and 41 and the lever resulting in an adjustment of the "off" position of the lever 5. After the adjustment has been made the lever 5 can only move back away from the drum the predetermined distance permitted by the clearance between the opening 33 and pin 34. The shoe 8 will be the only shoe which will have its "off" position clearance maintained substantially constant. Since the actuating lever 16 will always be returned to a fixed inoperative position by the spring 28 it causes the clearance between the shoe 10 and the drum to increase as the linings wear. If the latter clearance becomes too great it can be taken up as desired by readjusting the nuts 22 and 23.

From the foregoing it is seen that there is provided an adjusting means for a brake of the type described which will automatically maintain the "off" position clearance between one of the shoes and the drum substantially constant and at the same time create a stop for both brakes which will prevent the brake shoe carrying arms from being free to shift about on their pivots and cause one of the shoes to drag on the drum when the brake is released. The adjusting mechanism is very simple in construction and is readily associated with the brake by making a minimum of modifications. Only a single adjusting mechanism is required and it needs only to be associated with one brake shoe.

Referring to the modified structure shown in Figures 4 and 5, the lever 5' which carries brake shoe 8 is provided with an integral arm 43 extending beneath the drum 1. Pivoted on the pivot pin 31' of the lever is an arm 44 which also extends beneath the drum alongside arm 43 and to a point beyond the latter. The end of arm 44 is provided with an opening 45 in which are mounted two friction plugs 46 and 47 for cooperation with the surfaces of the spaced apart members 48 and 49 forming the base 4. A strong spring 50 is interposed between the plugs for forcing each into tight frictional engagement with the surface it contacts to thereby hold the arm in adjusted position. The end of arm 44 is also provided with two spaced flanges 51 and 52 for receiving a projection 53 on the end of arm 43. The space between the flanges is greater than the thickness of the projection to permit the arm 43 and the lever 5' to have limited movement without movement of the arm 44 to thus permit the shoe 8 to have predetermined "off" position clearance with respect to the drum when the brake is released. A light spring 54 tends to bias the arm 43 and lever 5' toward a position where the brake is released.

The shoe carrying levers 5' and 6 are actuated by structure similar to that shown in Figure 1 and when so actuated the shoes 8 and 10 will be engaged with the drum as shown in Figure 4. When the levers are released, the lever 5' will move away from the drum the distance permitted by the clearance between the projection 53 and the flanges 51 and 52. The friction device including the plugs 46 and 47 prevents any movement of arm 44. As the lining of the brake shoe 8 wears, the lever 5' will move closer to the drum and this movement will cause the arm 43 to engage the flange 51 and carry with it the arm 44 with a resultant slip of the friction plugs to establish a new position for the arm 44. After an adjustment is made due to lining wear, the lever 5' can only move away from the drum the predetermined distance permitted by the clearance between the projection 53 and flanges 51 and 52. It is thus seen that the modified construction functions in the same manner as the structure of Figure 1 to adjust the shoe 8 and to also insure that both shoes will be disengaged from the drum.

Being aware of the possibility of other modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, a support, a brake drum, a brake shoe pivotally mounted on the support for engagement with the drum, means for applying and releasing the brake shoe, and automatic adjusting means for the shoe to maintain the "off" position clearance thereof substantially constant, said means comprising an arm pivoted intermediate its ends to the support, means between one end of the arm and the support for limiting the pivotal movement of the arm in both directions, said limited pivotal movement determining the constant clearance, and a friction slip connection between the other end of the arm and the brake shoe for causing the arm to move with the shoe each time it is applied and permitting relative movement between the shoe and arm only when the brake shoe is applied and the arm is prevented from movement by its limiting means.

2. In braking apparatus, a support, a brake drum having an external friction surface, a brake shoe pivotally mounted on the support for engagement with the external surface of the drum, means for applying and releasing the brake shoe, and automatic adjusting means for the shoe to maintain the "off" position clearance thereof substantially constant, said means comprising an arm pivoted to the support, means for limiting the pivotal movement of the arm in both directions, said limited pivotal movement determining the constant clearance, and connecting means between the arm and the shoe for causing said arm and shoe to move together each time the shoe is applied and permitting relative movement of the shoe with respect to the arm only when the shoe is applied to the drum and the limiting means prevents the arm from moving with the shoe.

3. In braking apparatus, a support, a brake drum, a channel-shaped member pivoted to the support and carrying friction means adapted to cooperate with the drum, means for actuating the pivoted member, and automatically operable adjusting means for the member to maintain the "off" position clearance of the friction means substantially constant, said means comprising an arm pivotally mounted on the support and having an end positioned between the legs of the channel-shaped member, means for limiting the pivotal movement of the arm, friction members carried by the end of the arm and in abutting engagement with the inner surfaces of said legs of the channel-shaped member, and a spring interposed between the friction members.

4. In braking apparatus, a support, a brake drum having an external friction surface, a channel-shaped lever pivoted on the support, a brake shoe pivotally carried by the lever for cooperation with the external surface of the drum, means for actuating the lever to apply and release the brake shoe, and automatically operable adjusting means for the lever to maintain the "off" position clearance of the brake shoe substantially constant, said means comprising an arm pivotally mounted intermediate its ends on the support and having one end positioned between the legs of the channel-shaped lever, a pin on the support and positioned in an over-sized opening in the other end of the arm, friction members carried by the end of the arm which is positioned between the legs of the channel-shaped lever and a spring interposed between the friction members and biasing them into engagement with the inner surfaces on the legs of the channel-shaped lever.

5. In braking apparatus, a support, a brake drum provided with an external friction surface, two members pivoted on the support and positioned on opposite sides of the drum, friction means carried by each member for cooperation with the drum, means for actuating the pivoted members and comprising interconnecting linkage connected to the free ends of the members, and means cooperating with one of said members and the support for automatically maintaining the "off" position of the friction means on one member substantially constant and by means of the interconnecting linkage insuring that the other member will be in a position where its friction means will be away from the drum when the actuating means is released.

6. In braking apparatus, a support, a brake drum provided with an external friction surface, two members pivoted on the support and positioned on opposite sides of the drum, friction means carried by each member for cooperation with the drum, means for actuating the pivoted members and comprising interconnected linkage connected to the free ends of the members, and means cooperating with one of said members and the support for automatically maintaining the "off" position of the friction means on one member substantially constant and by means of the interconnecting linkage insuring that the other member will be in a position where its friction means will be away from the drum when the actuating means is released, said means comprising an arm pivoted on the support, a connection between said arm and the support, and a second connection between said arm and the said pivoted member, one of said connections comprising a lost motion connection and the other a friction slip connection.

7. In braking apparatus, a support, a brake drum, provided with an external friction surface, levers pivoted to the support and positioned on opposite sides of the drum, a brake shoe carried by each lever, means for actuating the levers to apply and release the brake shoes and comprising interconnecting linkage between the levers, and means for automatically adjusting the "off" position of one of the shoes and by means of the interconnecting linkage insuring that the other shoe will be maintained away from the drum when the actuating means is released, said means comprising an arm pivoted intermediate its ends on the support, means between one end of the arm and the support for limiting the pivotal movement of the arm in both directions, and a friction connection between the other end of the arm and one of the brake shoe carrying levers, said friction connection being of such intensity that the lever will have relative movement thereto only when said lever is operated by the actuating means to apply the brake shoes and the arm is prevented from pivotal movement by the limiting means.

8. In braking apparatus, a support, a brake drum provided with an external surface, two levers pivoted on the support and positioned on opposite sides of the drums, a brake shoe pivoted on each lever, an actuating lever pivoted to the free end of one of the brake shoe levers, an adjustable link connecting the actuating lever with the free end of the other brake shoe lever, and means cooperating with one of the levers and the support for automatically maintaining the "off" position of the shoe on one of the levers substantially constant, said means comprising an arm pivoted intermediate its ends to the support, a pin on the support, one end of the arm being provided with an oversize opening for receiving the pin, and friction means connecting the other end of the arm with the said one of the levers.

9. In braking apparatus, a support, a brake drum having an external friction surface, a lever pivotally mounted on the support and carrying a brake shoe for engagement with the external surface of the drum, means for applying and releasing the brake shoe by actuating the lever, and automatic adjusting means for the lever and shoe to maintain the "off" position clearance of the shoe substantially constant, said means comprising an arm secured to move with the lever, a second arm pivoted coaxially with the lever and lying adjacent the first arm, a friction connection between said second arm and the support and comprising two opposed fixed surfaces on the support, two members carried by the arm and abutting said surfaces and an expansion spring interposed between the members, and a lost motion connection between the first arm and the second arm permitting limited predetermined relative movement of the first arm with respect to the second arm.

10. In braking apparatus, a support, a brake drum provided with an external friction surface, levers pivoted to the support and positioned on opposite sides of the drum, a brake shoe carried by each lever, means for actuating the levers to apply and release the brake shoes and comprising interconnecting linkage connected to the free ends of the levers, and means for automatically adjusting the "off" position of one of the shoes and insuring that the other shoe will be maintained away from the drum when the actuating means is released, said means comprising an arm secured to move with one of the levers, a second arm pivoted coaxially with said lever and lying adjacent the first arm, a friction connection between said second arm and the support capable of being moved relative to the support only by substantial pressure and a lost motion connection between the first arm and the second arm permitting limited predetermined relative movement of the first arm with respect to the second arm.

JOHN C. COX.